(12) United States Patent
Petraccaro

(10) Patent No.: US 11,783,347 B2
(45) Date of Patent: Oct. 10, 2023

(54) TAMPER-PREVENTING SYSTEM AND RELATED METHOD FOR SHARING, COLLECTING AND PROCESSING DATA

(71) Applicant: Anna Maria Micheli, Naples (IT)

(72) Inventor: Roberto Petraccaro, Naples (IT)

(73) Assignee: Anna Micheli, Naples (IT)

( * ) Notice: Subject to any disclaimer, the term of this patent is extended or adjusted under 35 U.S.C. 154(b) by 326 days.

(21) Appl. No.: 17/427,645

(22) PCT Filed: Feb. 5, 2020

(86) PCT No.: PCT/IT2020/000011
§ 371 (c)(1),
(2) Date: Aug. 1, 2021

(87) PCT Pub. No.: WO2020/161753
PCT Pub. Date: Aug. 13, 2020

(65) Prior Publication Data
US 2022/0101338 A1 Mar. 31, 2022

(30) Foreign Application Priority Data
Feb. 6, 2019 (IT) .................. 201910000001673

(51) Int. Cl.
*G06Q 30/018* (2023.01)
*G06T 7/00* (2017.01)
*H04N 7/18* (2006.01)

(52) U.S. Cl.
CPC ......... *G06Q 30/018* (2013.01); *G06T 7/0002* (2013.01); *H04N 7/183* (2013.01)

(58) Field of Classification Search
CPC ..... G06Q 30/018; G06T 7/0002; H04N 7/183
See application file for complete search history.

(56) References Cited

U.S. PATENT DOCUMENTS

| | | | |
|---|---|---|---|
| 9,504,439 B2 | 11/2016 | Shao et al. | |
| 2004/0058343 A1 | 3/2004 | Macdonald | |
| 2008/0045832 A1 | 2/2008 | McGrath | |
| 2008/0133305 A1* | 6/2008 | Yates ................. | G06Q 30/08 705/26.1 |
| 2009/0012878 A1* | 1/2009 | Tedesco ............ | G06Q 30/0623 705/27.2 |
| 2014/0378810 A1 | 12/2014 | Davis et al. | |
| 2016/0027021 A1 | 1/2016 | Kerdemelidis | |

(Continued)

FOREIGN PATENT DOCUMENTS

| | | |
|---|---|---|
| EP | 2364647 A1 | 9/2011 |
| EP | 2465428 A1 | 6/2012 |

(Continued)

*Primary Examiner* — Thai Q Tran
*Assistant Examiner* — Jose M Mesa

(57) ABSTRACT

A tamper-preventing system is described, designed to guarantee a remote selling process of at least one object to be purchased, and to provide a seller and a buyer with a univocal, registered and sharable proof that the object has been packaged, shipped and received, such system being composed of a data collecting and processing system through an application program, contained in a mobile device, designed to perform three-dimensional shots of packaging means equipped with closing means and the object to be sold, on a mobile device.

7 Claims, 1 Drawing Sheet

(56) References Cited

U.S. PATENT DOCUMENTS

2016/0039611 A1\* 2/2016 Hoynash .............. B65G 17/345
209/552
2017/0007149 A1 1/2017 Ting
2017/0300905 A1\* 10/2017 Withrow ............... G06F 16/583

FOREIGN PATENT DOCUMENTS

| EP | 3257439 A1 | 12/2017 |
| WO | WO200107909 A1 | 2/2001 |
| WO | 2014049622 A1 | 4/2014 |
| WO | 2015067992 A1 | 5/2015 |

\* cited by examiner

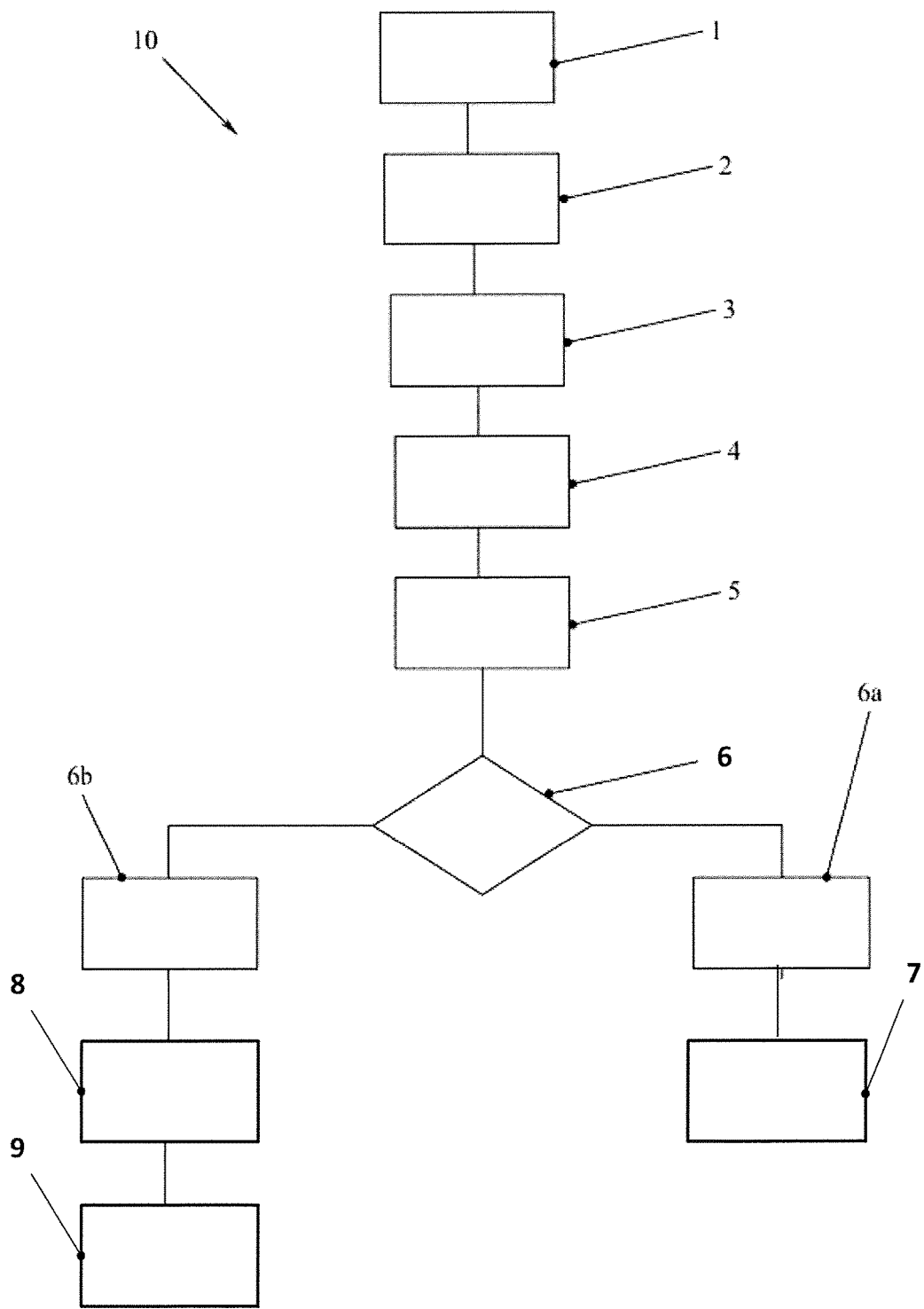

TAMPER-PREVENTING SYSTEM AND RELATED METHOD FOR SHARING, COLLECTING AND PROCESSING DATA

The present invention refers to a tamper-preventing system operating in remote selling processes.

Moreover, the present invention refers to a method for sharing, collecting and processing data.

It is known, according to the Code of Consumption, Art. 52 and following, that a buyer can exert a return right in the remote selling processes of goods, services, information, wherein the contractors electronically interact for the whole transaction or for a part thereof, using for such purpose computers, web-TVs and other tools designed to establish a connection between physically remote subjects.

Currently, there do not seem to exist means, systems, or devices which allow a univocal identification of the goods and which simultaneously allow displaying and verifying in real time a packaging operation and the related contents of a package.

Object of the present invention is solving the above prior art problems, by providing a tamper-preventing system which guarantees an optimum remote selling process.

Another object of the present invention is providing a system and a related method for sharing, collecting, and processing data capable of providing a guarantee to the buyer and to the seller about the correct execution of the selling process.

A further object of the present invention is providing a system capable of giving a univocal connection between the seller and a packaging means and/or a closing means of the packaging means of the object of the selling process.

Another object of the present invention is providing a system capable of scanning the packaging means, the closing means and the object of the selling process during the whole selling process, and of checking a possible tampering or damaging thereof.

The above and other objects and advantages of the invention, as will appear from the following description, are obtained with a tamper-preventing system as claimed in claim 1, and with a method for sharing, collecting, and processing data as claimed in claim 6. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as defined in the enclosed claims.

The present invention will be better described by some preferred embodiments thereof, provided as a non-limiting example, with reference to the enclosed drawing, in which FIG. 1 shows a block diagram of an embodiment of the method according to the present invention.

With reference to FIG. 1, a tamper-preventing system according to the present invention, is designed to:

- guarantee an optimum remote, or on-line, or web-commerce selling process, through a univocal identification of its seller subject, such as, for example, a company, an individual, etc., and/or of its buyer, such as, for example a company, a consumer, etc.;
- display and verify in real time the packaging operation of the object of the selling process, through a method for sharing, collecting, and processing data; and scan the packaging means, and/or the closing means, and/or the object during the selling process, through the method for sharing, collecting, and processing data, and verify the integrity of the object at the end of the selling process, comparing the images obtained during the initial step of the process, with the images obtained during the final step of the process.

Advantageously, the system and its related method allow providing the seller and the buyer with a univocal, recorded and sharable proof, which actually the object of the selling process has been packaged, shipped and received, reducing the chance of tampering and of damaging the object and the packaging means containing the object, and providing a warranty to the buyer and to the seller about the correct execution of the selling process, warranty which is currently not provided during the remote sales operations.

In particular, the system according to the present invention is a tamper-preventing system designed to guarantee a remote sales process of at least one object to be sold, and is designed to provide at least one seller and at least one buyer with a univocal, recorded and sharable proof that the object to be sold has been packaged, shipped and received; this system is substantially composed of:

- at least one data collecting and processing, through at least one application program contained in at least one mobile device, designed to perform three-dimensional shots of at least one packaging means, equipped with at least one closing means and the object to be sold, through at least one electronic device for acquiring images placed on the mobile device, comparing the plurality of acquired images and evaluating the physical conditions of the packaging means, of the closing means and of the object to be sold during its sales process;
- the closing means of said packaging means, such as for example an adhesive tape, equipped on its surface, for example through stamping, with at least one univocal, unmodifiable, undeletable code, designed to univocally identify the seller; and
- the packaging means, such as for example a cardboard box or a self-closing cardboard box, equipped with the univocal, unmodifiable, undeletable code adapted to univocally identify the seller related to at least one object to be sold, inserted in the packaging means, and the packaging means themselves.

The data collecting and processing system comprises:

- the application program, such as an information application, a native app, or a web-app, inserted in the mobile device, such as for example a smartphone or a table, of the seller and/or the buyer, designed to perform in real time an identification, a sharing, a scanning and a recording of at least one graphic element, such as for example a signature or an abbreviation, provided by the seller, and/or the identifying code, such as for example a numeric code, or an alpha-numeric code, or a symbolic code, or an encrypted code, placed on the packaging means, and/or on the closing means, designed to univocally identify the seller and/or the buyer related to the object to be sold, inserted in the packaging means;
- at least one sharing platform designed to enable the sharing by the seller and/or the buyer, of the identification of the seller and/or the buyer, both of a packaging operation and a related insertion of the object to be sold inside the packaging means, and/or of a placement of the closing means on the packaging means, and the related placement of the closing means on the packaging means; such sharing platform is possibly a web platform for social networking, such as for example Twitter®, Facebook®, etc. and/or a marketplace platform, such as for example Ebay®, Subito®, Amazon®, or a native platform;

the electronic device for acquiring images, such as a video camera, designed to enable a recording of the packaging operation and the insertion of the object inside the packaging means, and/or the placement of the closing means on the packaging means, and a scanning of the object during an initial step of the sales process;

the mobile device, such as a smartphone or a tabled, owned by the seller and/or the buyer, in which the application program is installed;

at least one operating system, such as Android, Blackberry OS, iOS or Windows Phone, designed to control an operation of the application program; and processing means comprising at least one data base which stores identifying data related to the seller, to the buyer, and to the closing means and/or packaging means, and the graphic element; such processing means can comprise any database management system, such as for example Oracle® or Sybase®.

Advantageously, the system is designed to create, through the electronic device for acquiring images and the application program, at least one visual field showing an area of action of the seller, during the packaging operation and the insertion of the object inside the packaging means, and of the buyer during the opening operation of the packaging means containing the object and of the closing means; an exit during the opening operation of the packaging means containing the object and of the closing means, from the hands of the seller and/or of the buyer and/or of the object from the created visual field, generating an issue of an acoustic warning signal by said system, preventing possible tampering behaviors.

In particular, the closing means are equipped with a pre-established linear dimension and are equipped on their surface with the identifying code, and possible with a metering element, placed on the whole linear dimension of the closing means.

Moreover, the closing means or a portion of the metering element are inserted inside the packaging means, during said process of inserting the object to be sold, allowing the buyer to place the closing means on the packaging means containing therein the object to be sold during at least one return procedure of the object.

In particular, the univocal identifying code contained on the closing means and/or on the packaging means is automatically generated and is designed to be associated with a single seller univocally, through performing of an identifying step of the method for sharing, collecting, and processing data. Moreover, the closing means are also equipped with a pre-established linear size and are equipped on the surface with the identifying code, and possibly with a metering element, through stamping, contained on the whole linear size of the closing means. Advantageously, the metering element contained on the closing means is designed to further enable identifying the object of the selling process and to enable identifying the internal volume of the packaging means, arranging the closing means along a horizontal and vertical dimension of the packaging means. Moreover, such metering element implies big advantages of use, also under contingent situations in a normal life, such as the delineation of parking areas, of accidents, easements of passage, etc., simultaneously enabling their identification and measure.

Moreover, a suitable portion of such closing means or of further closing means, is inserted in the packaging means, during the insertion procedure of the object of the sales procedure, allowing the buyer to place the closing means on a packaging means containing therein the object of the selling process during a possible return procedure of the object.

Advantageously, in an industrial application, such system further comprises an electronic device for acquiring images, such as for example, a video camera or other similar one, designed to enable the recording of the packaging operation and of the insertion of the object in the packaging means, and/or of the placement of the closing means on the packaging means, and the step of scanning the object during the initial step of the selling process.

In particular, the application program of the system contained on the mobile device, is capable of performing three-dimensional shots of the packaging means of the object of the selling process: in particular, it is designed to evaluate possible variations of shape, color, surface defects, etc., allowing to evaluate and compare the physical conditions of the packaging means and of the closing means during the whole selling process, both in the first step of the selling process care of the seller, and in the second step of the selling process care of the buyer, and possibly also during the step of transporting the packaging means during the selling process care of an operator responsible for transporting or other similar one, through an electronic device, such as, for example, a video camera, or other similar one, integrated or contained in the mobile device designed to acquire images.

Moreover, the application program is capable of performing three-dimensional shots also of the object of the selling process contained therein of the packaging means, allowing to evaluate and compare the acquired images from the seller during the first step of the selling process and the acquired images from the buyer during the last step of the selling process through an electronic device, such as, for example, a video camera, or other similar one, integrated or contained in the mobile device.

The invention further deals with a method 10 for sharing, collecting, and processing data through the above-described tamper-preventing system according to the present invention; the method comprises the steps of:

providing 1 the system, and installing the application program in the mobile device of the seller and of the buyer;

identifying 2 the seller and the buyer through the application program;

inserting by the seller the graphic element and/or the identifying code placed on the closing means or on the packaging means;

accepting and storing the graphic element and/or the identifying code by the application program, and associating the identifying code with previously recorded data of the seller;

inserting 3 by the seller the object inside the packaging means and placing the closing means, and/or the graphic element and/or the identifying code placed on the closing means and/or on the packaging means;

firstly scanning and acquiring 4 images of the object, and/or of the packaging means, and/or of the closing means by the seller through the mobile device when performing the inserting step 3;

possibly providing by the seller a multimedia file, by using the mobile device, possibly placed on at least one bearing element, designed to record the inserting step of the object inside the packaging means and the placement of the closing means;

sharing with the buyer the acquired images and possibly sharing on the dedicated sharing platform the multimedia file of the inserting step 3; starting the shipment process;

receiving the packaging means by the buyer;

secondly scanning and acquiring 5 images during an opening step of the object, and/or of the packaging means, and/or of the closing means by the buyer through the mobile device;

sharing with the seller the acquired images during the opening step of the packaging means;

comparing 6 by the mobile application the images acquired during the first scanning step 4 and during the second scanning step 5; and confirming 9 by the buyer a conclusion of the sales process.

In particular, if the comparing step 6 has a negative result 6a, the images acquired during the first scanning step 4 do not correspond to images acquired during the second scanning step 5, and then a signal is sent 7 to the seller and a related procedure is started for checking and reimbursing damages had by the buyer and/or seller, and providing, by the buyer, the multimedia file, by using the mobile device, possibly placed on the bearing element, designed to record an opening step of the packaging means and of the closing means, and related confirmation of the object to be sold; if the result of the comparison is positive 6b, the images acquired during the first scanning step 4 correspond with images acquired during the second scanning step 5, and then the buyer provides 8 the multimedia file, by using the mobile device, possibly placed on the bearing element, designed to record an opening step of the packaging means and of the closing means, and provide a related confirmation of the object to be sold.

The invention claimed is:

1. Tamper-preventing system designed to guarantee a remote sales process of at least one object to be sold, characterized in that it is designed to provide at least one seller and at least one buyer with a univocal, recorded and sharable proof that said object to be sold has been packaged, shipped and received, said system being composed of:

at least one data collecting and processing system, through at least one application program contained in at least one mobile device, designed to perform three-dimensional shots of at least one packaging means, equipped with at least one closing means and said object to be sold, through at least one electronic device for acquiring images placed on said mobile device, comparing the plurality of acquired images and evaluating the physical conditions of said packaging means, of said closing means and of said object to be sold during its sales process;

said closing means of said packaging means, equipped on its surface with at least one univocal, unmodifiable, undeletable code, designed to univocally identify said seller; and said packaging means, equipped with said univocal, unmodifiable, undeletable code adapted to univocally identify said seller related to at least one object to be sold, inserted in said packaging means.

2. System according to claim 1, characterized in that said data collecting and processing system comprises:

said application program, inserted in said mobile device of said seller and/or said buyer, designed to perform in real time an identification, a sharing, a scanning and a recording of at least one graphic element provided by said seller, and/or said identifying code placed on said packaging means, and/or on said closing means;

at least one sharing platform designed to enable the sharing by said seller and/or said buyer, of said identification of said seller and/or said buyer, of a packaging operation and a related insertion of said object to be sold, inside said packaging means, and/or of a placement of said closing means on said packaging means;

said electronic device for acquiring images, such as a video camera, designed to enable a recording of said packaging operation and said insertion of said object inside said packaging means, and/or the placement of said closing means on said packaging means, and a scanning of said object during an initial step of the sales process;

said mobile device;

at least one operating system designed to control an operation of said application program; and processing means comprising at least one data base which stores identifying data related to said seller, to said buyer, and to said closing means and/or packaging means, and said graphic element.

3. System according to claim 1, characterized in that it is designed to create, through said electronic device for acquiring images and said application program, at least one visual field showing an area of action of said seller, during said packaging operation and said insertion of said object inside said packaging means, and of said buyer during said opening operation of said packaging means containing said object and of said closing means; an exit during said opening operation of said packaging means containing said object and of said closing means, from the hands of said seller and/or of said buyer and/or of said object from said created visual field, generating an issue of an acoustic warning signal by said system, preventing possible tampering behaviors.

4. System according to claim 1, characterized in that said closing means are equipped with a pre-established linear dimension and are equipped on their surface with said identifying code, and possible with a metering element, placed on the whole linear dimension of said closing means.

5. System according to claim 4, characterized in that said closing means or a portion of said metering element are inserted inside said packaging means, during said process of inserting said object to be sold, allowing said buyer to place said closing means on said packaging means containing therein said object to be sold during at least one return procedure of said object.

6. Method for sharing, collecting and processing data through said system according to claim 1, said method comprising the steps of:

providing the system, and installing the application program in the mobile device of said seller and of said buyer;

identifying said seller and said buyer through said application program;

inserting by said seller said graphic element and/or said identifying code placed on said closing means or on said packaging means;

accepting and storing said graphic element and/or said identifying code by said application program, and associating said identifying code with previously recorded data of said seller;

inserting by said seller said object inside said packaging means and placing said closing means, and/or said graphic element and/or said identifying code placed on said closing means and/or on said packaging means;

firstly scanning and acquiring images of said object, and/or of said packaging means, and/or of said closing means by said seller through said mobile device when performing said inserting step;

possibly providing by said seller a multimedia file, by using said mobile device, possibly placed on at least one bearing element, designed to record said inserting step of said object inside said packaging means and the placement of said closing means;

sharing with said buyer the acquired images and possibly sharing on said dedicated sharing platform said multimedia file of said inserting step;

starting said shipment process;

receiving said packaging means by said buyer;

secondly scanning and acquiring images during an opening step of said object, and/or of said packaging means, and/or of said closing means by said buyer through said mobile device;

sharing with the seller said acquired images during said opening step of said packaging means;

comparing by said mobile application said images acquired during said first scanning step and during said second scanning step; and confirming by said buyer a conclusion of said sales process.

7. Method according to claim 6, characterized in that, if said comparing step has a negative result, said images acquired during said first scanning step do not correspond to images acquired during said second scanning step, and then a signal is sent to the seller and a related procedure is started for checking and reimbursing damages had by said buyer and/or seller, and providing, by said buyer, said multimedia file, by using said mobile device, possibly placed on said bearing element, designed to record an opening step of said packaging means and of said closing means, and a related confirmation of said object to be sold; if the result of said comparison is positive, said images acquired during said first scanning step correspond with images acquired during said second scanning step, and then said buyer provides said multimedia file, by using said mobile device, possibly placed on said bearing element, designed to record an opening step of said packaging means and of said closing means, and a related confirmation of said object to be sold.

* * * * *